United States Patent [19]

Rossbach

[11] 4,133,010

[45] Jan. 2, 1979

[54] SOUND RECORDING APPARATUS

[75] Inventor: Horst Rossbach, Eichenau, Fed. Rep. of Germany

[73] Assignee: AGFA-Gevaert AG, Leverkusen, Fed. Rep. of Germany

[21] Appl. No.: 793,868

[22] Filed: May 4, 1977

[30] Foreign Application Priority Data

May 6, 1976 [DE] Fed. Rep. of Germany ....... 2620116

[51] Int. Cl.² .............................................. G11B 5/02
[52] U.S. Cl. ...................................................... 360/68
[58] Field of Search .............................. 360/68, 67, 66

[56] References Cited

U.S. PATENT DOCUMENTS 3,530,257  9/1970  Brown, Jr. .............................. 360/68
3,806,828  4/1974  Johnson ................................. 360/68

OTHER PUBLICATIONS

"Record Current Driver for Battery Operated Recorder"–Higgin-Botham et al.; IBM TDB, vol. 18, #11, Apr. 1976.
"Design of Mag. Recording & Playback Amplifiers'-'-Sah et al.; IEE-Terg Proceedings-India, vol. 13, #2, pp. 39-46, Mar./Apr. 1975.

Primary Examiner—Vincent P. Canney
Attorney, Agent, or Firm—Michael J. Striker

[57] ABSTRACT

A sound recording head includes an induction coil. A feedback resistor is connected in series with the induction coil between the input and output of an operational amplifier to form the feedback branch of the amplifier. A load resistor is connected to the junction between the feedback resistor and the induction coil. An audio-frequency audio signal and also a higher-frequency magnetic biasing signal are applied to the operational amplifier input. The open-loop gain of the operational amplifier is at least one order of magnitude greater than the gain of the amplifier with the aforementioned feedback branch connected thereto. The resistance of the feedback resistor is at least one order of magnitude greater than the impedance of the induction coil at the frequency of the magnetic biasing signal. The resistance of the load resistor is at least one order of magnitude smaller than the impedance of the induction coil at the frequency of the magnetic biasing signal.

5 Claims, 2 Drawing Figures

SOUND RECORDING APPARATUS

BACKGROUND OF THE INVENTION

The invention relates to an apparatus for recording sound on an audio-information recording medium, preferably utilized in a motion-picture camera, the recording apparatus including a recording head to which are applied both audio-frequency audio signals and also higher-frequency magnetic biasing signals.

With such sound-recording apparatuses, it is necessary that the audio-frequency audio signal to be recorded be applied to the sound recording head in superposition with a constant magnetic biasing current whose amplitude is independent of changes in the frequency of the audio signals.

The impedance of the induction coil of the recording head and likewise the current flowing through the induction coil is frequency-dependent. Accordingly, it has been proposed to connect a biasing resistor in series with the induction coil, the resistance of the biasing resistor being large compared to the induction-coil impedance at the highest frequency of the signals applied to the induction coil. The greater the resistance of the biasing resistor, the closer is the approximation to a frequency-independent audio-frequency constant-current source. However, this expedient has the disadvantage that the large resistance of the biasing resistor reduces the sensitivity and therefore the efficiency of the recording means.

SUMMARY OF THE INVENTION

It is a general object of the invention to provide a sound-recording apparatus of the general type in question in which the disadvantages just mentioned are avoided, and in which in a simple and reliable way constancy of the current flowing through the recording head is achieved even at the frequency of the higher-frequency magnetic biasing signal.

According to one concept of the invention, this can be achieved by connecting the induction coil together with a feedback resistor between the input and output of an operational amplifier as the feedback branch thereof. The operational amplifier is to have an open-loop gain which is at least one order of magnitude greater (10 times, 100 times, etc.) than its gain with the aforementioned feedback branch connected thereto. A load resistor is connected to the junction between the feedback resistor and the induction coil. The resistance of the load resistor is at least one order of magnitude smaller than (1/10, 1/100, etc.) the impedance of the induction coil at the frequency of the magnetic biasing signal. Then, with the open-loop amplifier gain being at least one order of magnitude greater than its closed-loop gain, the frequency-dependent impedance of the induction coil becomes negligible. In that event, the ratio of the amplifier output voltage to its input voltage is approximately equal to the ratio of the resistance of the feedback resistor to the resistance of the resistor(s) connected to the inverting input of the operational amplifier.

Additionally, the use of an operational amplifier produces the further advantage that, because of its very high open-loop gain, the amplification produced when the aforementioned feedback branch is connected to the amplifier is sufficient for driving the induction coil.

The negligibility of the highest value which the impedance of the induction coil achieves during operation is also attributable to the fact that this impedance value is negligibly small compared to that of the aforementioned feedback resistor.

Because the resistance of the load resistor is small compared to the impedance of the induction coil at the frequency of the magnetic biasing signal, it is advantageously achieved that the voltage on the induction coil is large relative to the voltage drop across the load resistor. This makes for an optimal degree of efficiency, so that even at low battery voltage the recording level on the recording medium will be sufficiently high. This results in optimal utilization of the battery voltage. Additionally, this makes for a simple form of recording equalization or avoidance of distortion. Furthermore, the tolerances of the recording head can be readily compensated for if desired.

If, according to a further concept of the invention, the resistance of the load resistor is made at least one order of magnitude smaller than (1/10, 1/100, etc.) the resistance of the aforementioned feedback resistor, there results the further advantage that the current flowing through the induction coil of the recording head will be determined substantially exclusively by the voltage drop across the load resistor and the resistance of the load resistor. This makes it easy to adjust the induction coil current for compensatory or fine-adjustment purposes. To this end, it is advantageous to use for the load resistor an adjustable resistor.

According to a further concept of the invention, the load resistor is constituted by a controllable semi-conductor element having a control electrode and means for applying an adjustable control voltage to the control electrode. In order to prevent recording onto the recording medium of switching noise generated when the recording apparatus is switched on, the means for applying the control voltage to the aforementioned control electrode can provide a control voltage which changes as a function of time during the switch-on time interval, so that actual recording of sound will not occur until switch-on has been completed. If the recording apparatus is used in a motion-picture camera, then the time delay is advantageously such that sound does not begin to be recorded until after the camera motor has reached its rated speed.

According to another concept of the invention, the audio-frequency audio signals are applied to the inverting input of the operational amplifier, whereas the higher-frequency magnetic biasing signal is applied to the non-inverting input.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
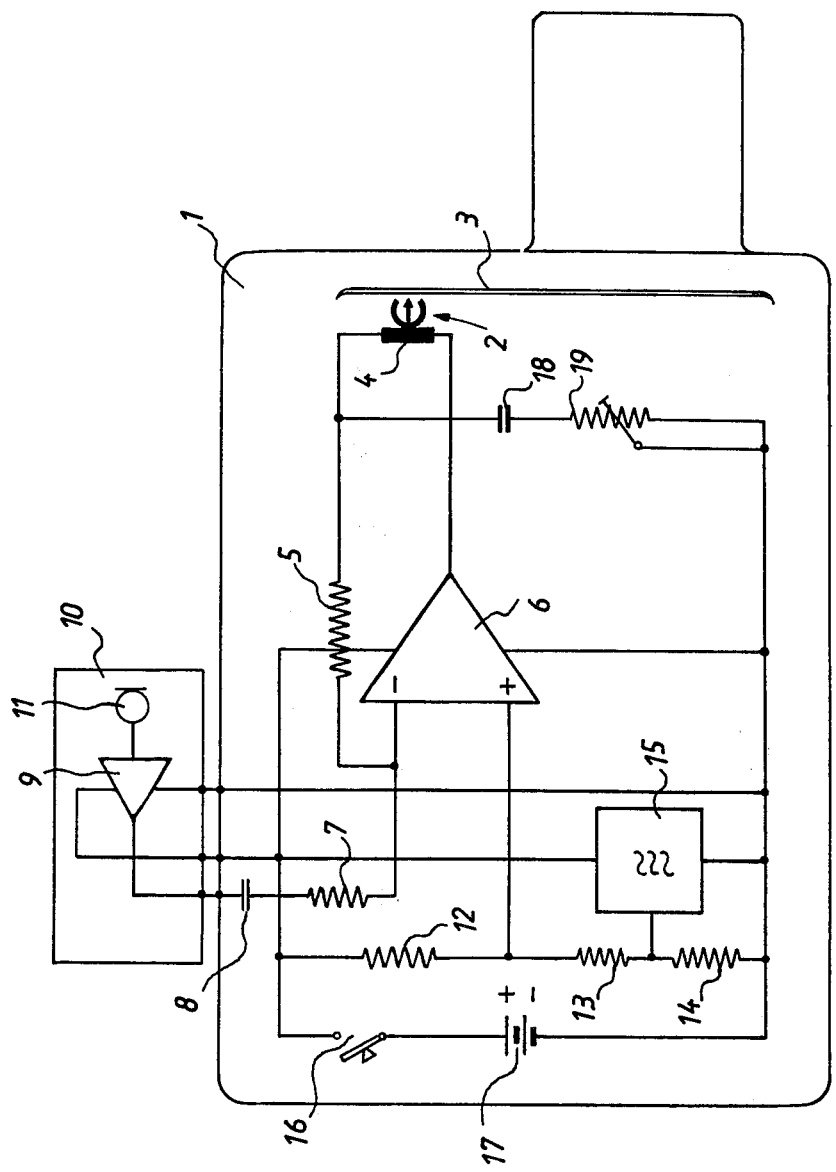
FIGS. 1 and 2 depict two exemplary embodiments of the invention.

In FIG. 1, numeral 1 denotes a motion-picture camera provided with a sound-recording apparatus. The latter includes a recording head 2 arranged adjacent to the sound track of a sound motion-picture film 3. The induction coil 4 of the recording head 2 is connected in series with an ohmic resistor 5. The resistance of resistor 5 is at least one order of magnitude greater than (10 times, 100 times, etc.) the impedance of coil 4 at the frequency of the magnetic biasing signal applied thereto (discussed below).

The series connection of coil 4 and resistor 5 is connected between the output and inverting input of an operational amplifier 6, to constitute the feedback branch thereof. The inverting input of the operational amplifier is connected via a further resistor 7 and a coupling capacitor 8 to the output of an amplifier 9 of a microphone unit 10, the microphone of which is denoted by 11. The non-inverting input of the operational amplifier 6 is connected to the tap of a voltage divider comprised of resistors 12, 13 and 14. The junction between resistors 13 and 14 is connected to the output of a high-frequency oscillator 15, which supplies the magnetic biasing signal for the recording head. Numeral 16 denotes a start switch, and numeral 17 a camera battery which becomes connected to the illustrated circuitry when start switch 16 is closed.

Connected to the junction between feedback resistor 5 and induction coil 4, via a coupling capacitor 18, is a load resistor 19. The resistance of load resistor 19 is at least one order of magnitude smaller (1/10, 1/100, etc.) than the impedance of the induction coil 4 at the frequency of the magnetic biasing signal. Accordingly, the resistance of load resistor 19 is at least one order of magnitude smaller than the resistance of feedback resistor 5. If the input voltage is constant, with the ratio between the feedback resistor 5 and the biasing resistor 7 constant, the output current through the induction coil is determined substantially exclusively by the resistance of load resistor 19. The output current is frequency-independent.

Figure 2:
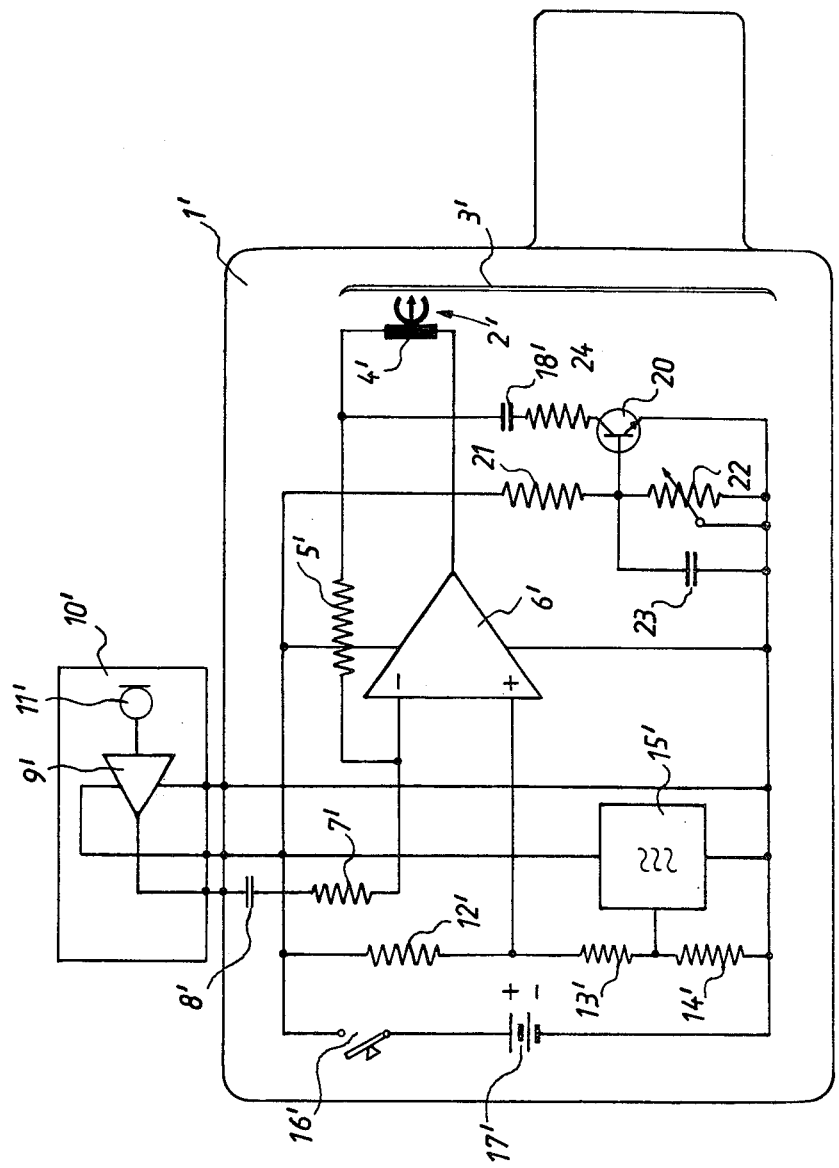

In the embodiment of FIG. 2, components corresponding to those in FIG. 1 are indicated by the same reference numerals, with the addition of a prime.

In FIG. 2, the load resistor is comprised of a transistor 20 and a resistor 24, the base of transistor 20 being connected to the tap of a voltage divider comprised of resistors 21 and 22. Resistor 22 is an adjustable resistor. Connected in parallel to resistor 22 is a timing capacitor 23. When start switch 16' is closed, resistor 22 will initially be bridged over by the uncharged capacitor 23, so that transistor 20 will be initially non-conductive. Only upon elapse of the time interval determined by the resistances of resistors 21, 22 and the capacitance of capacitor 23, does the capacitor become charged up to the voltage of the tap of voltage divider 21, 22 and render transistor 20 conductive.

It will be understood that each of the elements described above, or two or more together, may also find a useful application in other types of circuits and constructions differing from the types described above.

While the invention has been illustrated and described as embodied in a sound recording apparatus used in a motion-picture camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a sound recording apparatus, particularly for use in motion-picture cameras and the like, in combination, a sound recording head including an induction coil means; an operational amplifier having input means and output means; negative-feedback resistor means connected together with the induction coil means between the input means and the output means of the operational amplifier to form the negative-feedback branch of the operational amplifier; load resistance means connected to the junction between the feedback resistor means and the induction coil means; means for applying to the input means of the operational amplifier an audio-frequency audio signal and a higher-frequency magnetic biasing signal, the open-loop gain of the operational amplifier being at least one order of magnitude greater than the gain of the amplifier when the aforementioned negative-feedback branch is connected thereto, the resistance of the feedback resistor means being at least one order of magnitude greater than the impedance of the induction coil means at the frequency of the magnetic biasing signal, and the resistance of the load resistance means being at least one order of magnitude smaller than the impedance of the induction coil means at the frequency of the magnetic biasing signal.

2. In the sound recording apparatus defined in claim 1, the load resistance means comprising adjustable-resistance means.

3. In the sound recording apparatus defined in claim 1, the load resistance means comprising a controllable semiconductor element having a control electrode and means for applying a control signal to the control electrode.

4. In the sound recording apparatus defined in claim 3, the means for applying the control signal comprising a start switch and time-delay means operative for applying the control signal in response to activation of the start switch but after the elapse of a predetermined time delay.

5. In the sound recording apparatus defined in claim 1, the input means of the operational amplifier comprising an inverting input and a non-inverting input, the means for applying the audio signal and the magnetic biasing signal comprising means for applying the audio signal to the inverting input and means for applying the magnetic biasing signal to the non-inverting input.

* * * * *